UNITED STATES PATENT OFFICE.

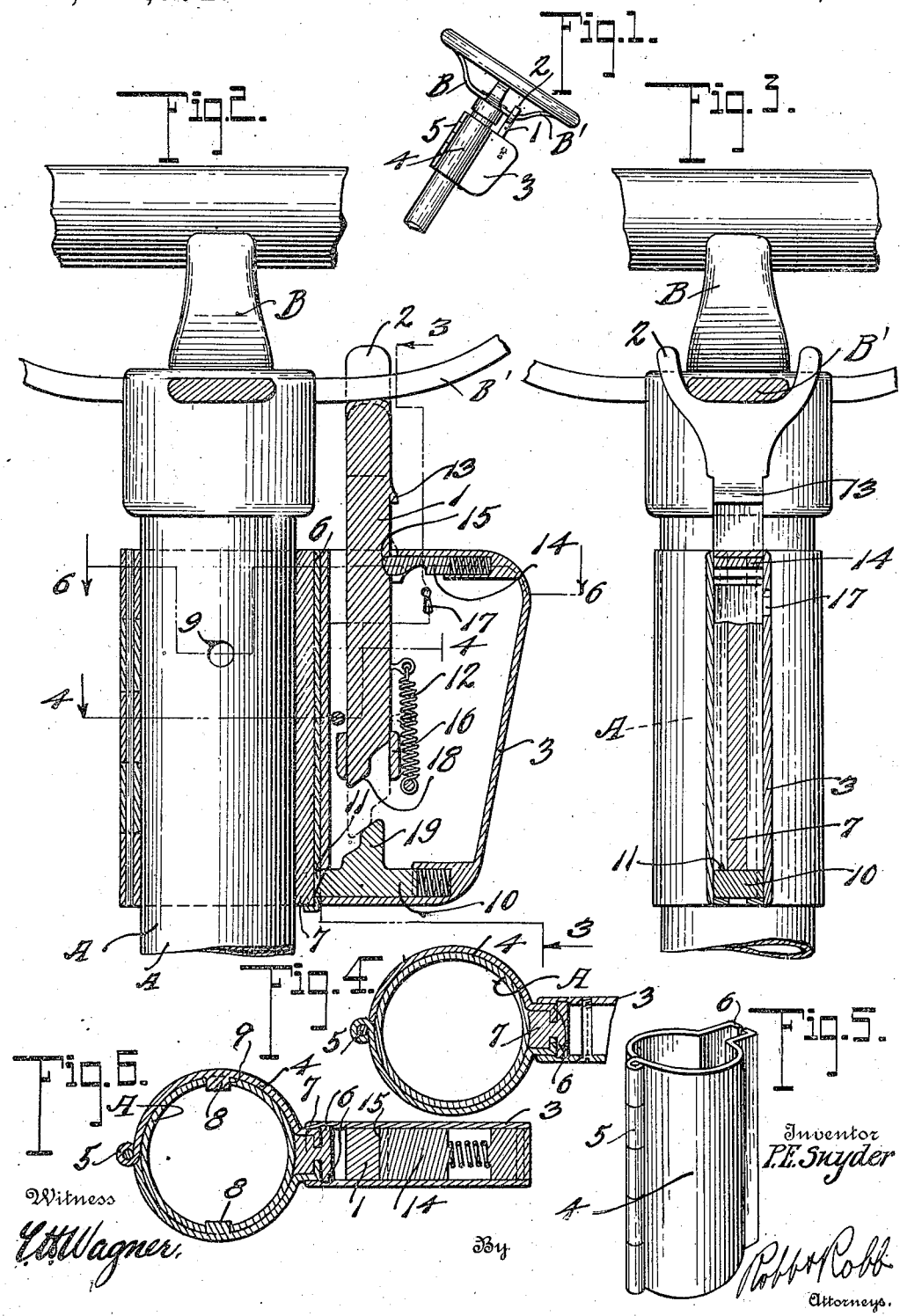

PERRY E. SNYDER, OF ANGOLA, INDIANA.

LOCKING DEVICE FOR STEERING-WHEELS.

1,216,871.  Specification of Letters Patent.  Patented Feb. 20, 1917.

Application filed July 26, 1916. Serial No. 111,451.

*To all whom it may concern:*

Be it known that I, PERRY E. SNYDER, a citizen of the United States, residing at Angola, in the county of Steuben and State of Indiana, have invented certain new and useful Improvements in Locking Devices for Steering-Wheels, of which the following is a specification.

The present invention comprises an improved locking means for motor vehicles of the type involving the provision of a locking device mounted on the steering column and engageable with the steering wheel to prevent the operation of the latter and thereby prevent the use of the vehicle.

An especial object of the invention has been to devise a lock means of the above type which may be applied very quickly to any of the common types of motor vehicles now in use by the employment of simple tools, and which affords an extremely effective locking action for the purpose set forth.

With a view to the foregoing the invention utilizes a locking member for the steering wheel which is likewise a controlling device for the means whereby the locking device of the invention is attached to the steering column. In its broad phase of operation the locking member for the steering wheel is susceptible of normal usage for the purpose of placing the same in locking coöperation with the wheel and for unlocking the wheel. Said locking member, however, is susceptible of an abnormal operation whereby to actuate other locking means employed for connecting the locking device of the invention with the steering column, so that said locking device may be removed whenever desired.

For a full understanding of the present invention, reference is to be had to the following description and the accompanying drawing, wherein:

Figure 1 is a side elevation showing the application of the invention in operative position with respect to the steering wheel of a motor vehicle.

Fig. 2 is an enlarged vertical sectional view.

Fig. 3 is a sectional view on the line 3—3 of Fig. 2.

Fig. 4 is a sectional view on the line 4—4 of Fig. 2.

Fig. 5 is a perspective view of the steering column clamp; and

Fig. 6 is a sectional view on the line 6—6 of Fig. 2.

Throughout the following detail description, and on the several figures of the drawing, similar parts are referred to by like reference characters.

Specifically describing this invention A designates a steering column of a motor vehicle and B the steering wheel supported thereby. 1 refers to a locking member provided at its upper end with a forked extremity 2 for coöperation with one of the arms of the steering wheel spider B' when it is desired to lock the steering wheel against rotation as will hereinafter be more particularly pointed out. The locking member 1 extends into a lock casing 3 which is supported in proper relation to the steering wheel by clamping means consisting of a sectional clamp or encircling band 4, the sections of which are hingedly connected at 5. The sections of the clamp are formed with offstanding flanges 6 which are angle-shaped and are adapted to be received into the solid portion 7 of the lock casing 3, said solid portion being suitably provided with spaced slots corresponding in shape to the flanges 6. The coöperation of the casing and clamp is obtained by placing the clamping member about the steering column adjacent to the hub of the steering wheel, the sections of the clamping means being each provided with an inner projection 8 adapted to be seated in an aperture drilled into said steering column as indicated at 9, whereupon the casing 3 is slid upwardly upon introduction of the flanges 6 as above mentioned until the nose of the spring actuated locking bolt 10 located at the base of the casing 3 engages in the notched portion of the flanges 6, as indicated at 11. The locking device is thus secured in position upon the steering wheel support A.

The locking member 1 is normally held retracted into the casing 3 by means of a spring 12 and is provided with a lateral projection 13 which is engaged by a key operated bolt 14 arranged at the upper portion of the casing 3. This is an intermediate or the normal position assumed by the locking member 1 when the device is inoperative with relation to the steering wheel. When it is desired to lock the latter, the locking member 1 is moved upwardly until the forked extremity engages with the spider arm B' at which position the locking bolt 14 engages in a notch 15 formed in the locking member. The movement of the locking member is guided by suitable guide means 16 formed on the lock casing.

When it is desired to disengage the locking member 1 from the steering wheel a suitable key is inserted into the key hole 17, and upon rotation said key retracts the bolt 14 and permits the locking member 1 to drop under the actuation of the spring 12 into its normal or intermediate position.

It is designed that the device hereinbefore described may be readily subject to removal from the steering wheel support and this is accomplished in the following manner: The key mentioned above is again utilized to retract the bolt 14 for the purpose of disengaging it from the shoulder or projection 13 whereupon the locking member may be depressed so that its lower end which is beveled off as indicated at 18 moves the locking bolt 10 laterally by coaction with the vertical projection 19 thereby disengaging the nose of said bolt from its interlocking position with respect to the flanges 6 of the clamping member 4. The casing 3 will then be free to be moved bodily from engagement with the flanges and the clamp may then be displaced from the steering wheel column. The reverse of the foregoing operation will attach the locking device in operative position with respect to the steering wheel as will be obvious.

From the foregoing it will be understood that the locking member 1 is operative normally for the purposes of engaging and disengaging the same with respect to the steering wheel and by abnormal operation of said locking member the casing 3 may be unlocked in relation to the clamping member 4 and these parts separated to permit of removal of the locking device from the steering wheel support. Since the removal of the device is something which is not required once the invention has been put into use the abnormal functioning of the locking device is not required to any great extent but is essentially desirable so that the locking member 1 may perform a controlling function in respect to the locking means intermediate the clamping member 4 and the casing 3 for the lock mechanism.

It is furthermore, understood that I do not wish to be limited to the specific locking constructions which I have described and illustrated in connection with my specification for the reason that any suitable type of locking means capable of performing the several functions described hereinbefore may be utilized, the detail formation of the locking parts and key actuating means therefor not being material to the invention for obvious reasons.

Having thus described my invention, what I claim as new is:

1. In means of the class described, the combination with a vehicle steering member and support therefor, of a locking member engageable with said steering member, a casing for said locking member, means in said casing for holding the locking member in position for engagement with the steering member, and means interlocking the casing on the support and operable by the locking member to release the casing from the support.

2. In means of the class described, the combination with a vehicle steering member and support therefor, of a locking member engageable with said steering member, means for holding said locking member in engagement with the steering member, a clamping device coöperating with the steering member and support, and means interlocking with said clamping member for holding the latter on said support and operable by the locking member to effect displacement of the clamping member from the support.

3. In means of the class described, the combination with a vehicle steering member and support therefor, of a locking member engageable with the steering member, a casing therefor, means in said casing for holding the locking member in and out of engagement with the steering member, means for sustaining said casing upon the steering member support, and a locking element carried by said casing and interlocking the latter with the sustaining means.

4. In means of the class described, the combination with a vehicle steering member and support therefor, of a locking member engageable with the steering member, a casing therefor, means in said casing for holding the locking member in and out of engagement with the steering member, means for sustaining said casing upon the steering member support, and a locking element carried by said casing and interlocking the latter with the sustaining means, said locking element being arranged in the path of movement of the first mentioned locking member for operation thereby to effect displacement of the casing from the sustaining means.

5. In means of the class described, the combination with a vehicle steering member and support therefor, of a locking member engageable with the steering member, a casing in which said locking member is mounted, a clamp encircling the steering member support and having interlocking engagement with the casing, a locking bolt at one end of the casing engageable with the locking member to hold it projected from the casing, and a second locking bolt in said casing coöperating with the clamping member for holding the casing in locking engagement therewith, said second locking bolt being operable by the locking member first-mentioned to disengage the same.

6. In means of the class described, the combination with a vehicle steering member and support therefor, of a locking member engageable with the steering member, a lock casing in which said locking member is mounted, a key operated locking bolt engageable with the locking member to hold the locking member in one position engaging the steering member and in a second position disengaged therefrom, a clamping member having interlocking engagement with the steering member support and with which the casing engages for support, and means for holding the casing in engagement with the clamping member.

7. In means of the class described, the combination with a vehicle steering member and support therefor, of a locking member, a casing in which said locking member is slidably mounted, and means for locking the casing upon the steering member support, said first mentioned locking member being movable in one direction to engage the steering member and movable in the opposite direction for impinging the last-mentioned locking means to effect release of the casing.

8. In means of the class described, the combination of a vehicle steering member and support therefor, of a locking member engageable with said steering member, a casing in which said locking member is movably mounted, a sectional clamping device encircling the steering member support and interlocked with the casing, means on said clamping device for preventing displacement of the latter when in engagement with the casing, a locking bolt carried by said casing and engaging the clamping member for holding the casing in engagement therewith, a key operated locking bolt engageable with the first mentioned locking member to hold it at adjusted positions, a spring normally tending to hold the locking member retracted into the casing, said locking member being engageable upon abnormal movement with the locking bolt engaging the clamping member whereby to disengage the latter for displacement of the lock casing.

In testimony whereof I affix my signature.

PERRY E. SNYDER.